(12) United States Patent
Ohta et al.

(10) Patent No.: US 7,978,438 B2
(45) Date of Patent: Jul. 12, 2011

(54) THIN-FILM MAGNETIC HEAD WITH SHIELD LAYER PROFILE HAVING OBTUSE OR ROUNDED CORNERS, MAGNETIC HEAD ASSEMBLY, MAGNETIC DISK DRIVE APPARATUS AND MANUFACTURING METHOD OF THIN-FILM MAGNETIC HEAD

(75) Inventors: Naoki Ohta, Tokyo (JP); Kosuke Tanaka, Tokyo (JP); Takayasu Kanaya, Tokyo (JP); Kazuki Sato, Tokyo (JP); Yasufumi Uno, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 959 days.

(21) Appl. No.: 11/774,912

(22) Filed: Jul. 9, 2007

(65) Prior Publication Data
US 2008/0019056 A1    Jan. 24, 2008

(30) Foreign Application Priority Data
Jul. 18, 2006    (JP) .................................. 2006-195562

(51) Int. Cl.
*G11B 5/39* (2006.01)
(52) U.S. Cl. ....................................... 360/319; 360/317
(58) Field of Classification Search .................. 360/317, 360/319
See application file for complete search history.

(56) References Cited

U.S. PATENT DOCUMENTS

| 6,584,676 | B1 * | 7/2003 | Chang et al. | 29/603.12 |
| 2005/0157431 | A1 * | 7/2005 | Hatatani et al. | 360/319 |
| 2008/0013220 | A1 * | 1/2008 | Yasukawa | 360/319 |
| 2008/0304186 | A1 * | 12/2008 | Watanabe et al. | 360/319 |
| 2009/0027809 | A1 * | 1/2009 | Kamijima et al. | 360/319 |
| 2009/0046394 | A1 * | 2/2009 | Okamoto et al. | 360/319 |

FOREIGN PATENT DOCUMENTS

| JP | U-1-66606 | 4/1989 |
| JP | A 2001-006121 | 1/2001 |
| JP | A-2003-317214 | 11/2003 |
| JP | A-2004-39148 | 2/2004 |
| JP | A-2004-127407 | 4/2004 |

OTHER PUBLICATIONS

Japanese Office Action issued on Nov. 10, 2009 in Japanese Patent Application No. 2006-195562.

* cited by examiner

*Primary Examiner* — Jefferson Evans
(74) *Attorney, Agent, or Firm* — Oliff & Berridge, PLC

(57) ABSTRACT

A thin-film magnetic head provided with at least one MR read head element includes a lower shield layer, an upper shield layer, and an MR layer formed between the lower shield layer and the upper shield layer. A profile of the upper shield layer, appeared at an ABS, has obtuse or rounded upper corners at end edges of the upper shield layer along a track-width direction.

16 Claims, 14 Drawing Sheets

THIN-FILM MAGNETIC HEAD WITH SHIELD LAYER PROFILE HAVING OBTUSE OR ROUNDED CORNERS, MAGNETIC HEAD ASSEMBLY, MAGNETIC DISK DRIVE APPARATUS AND MANUFACTURING METHOD OF THIN-FILM MAGNETIC HEAD

PRIORITY CLAIM

This application claims priority from Japanese patent application No. 2006-195562, filed on Jul. 18, 2006, which is incorporated herein by reference.

BACKGROUND OF THE INVENTION

1. Field of the Invention

The present invention relates to a thin-film magnetic head with a magnetoresistive effect (MR) read head element, to a magnetic head assembly, to a magnetic disk drive apparatus, and to a method for manufacturing a thin-film magnetic head.

2. Description of the Related Art

As hard disk drive (HDD) apparatuses increase in capacity and reduce in size, highly sensitive thin-film magnetic heads capable of coping with higher recording density are being demanded. In order to meet this demand, characteristics of a giant magnetoresistive effect (GMR) thin-film magnetic head with a GMR read head element are being improved. On the other hand, a tunnel magnetoresistive effect (TMR) thin-film magnetic head with a TMR read head element that will provide magnetoresistivity more than twice as high as that of the GMR thin-film magnetic head has become commercially practical.

Recently, lower and upper shield layers sandwiching an MR layer in an MR read head element of such a thin-film magnetic head for supporting a high recording density are becoming thinner. As the shield thickness of the lower and upper shield layers becomes thinner with respect to the shield width, the concentration of magnetic fluxes on their end edges becomes prominent. While this tendency appears in the lower and upper shield layers formed thin by plating as well, it is especially noticeable when films of the lower and upper shield layers are deposited by sputtering and then patterned by ion milling. This is because cross-section of the layers is sharpened by ion milling regardless of the width or thickness of the end edges of the layers.

FIG. 1 illustrates a cross-section of one end edge of a lower shield layer fabricated as a thin film by using a conventional method, viewed from the air bearing surface (ABS) side of a thin-film magnetic head.

As will be understood from FIG. 1, the end edge 10a of the lower shield layer 10 appeared at the ABS if it is fabricated by a conventional manufacturing method is not vertical to the layer-lamination planes but is sloped. This slope has caused a problem that magnetic fields concentrate at the end edge 10a under the influence of external magnetic fields or magnetic fields from the write head element and the concentrated magnetic fields are applied to a magnetic medium facing the thin-film magnetic head, inducing an unwanted write to the magnetic medium. This adverse effect on a magnetic medium caused by the shape of the end edges of the lower and upper shield layers has been more noticeable in an apparatus where the write head element has a perpendicular magnetic recording structure than in that where the write head element has a horizontal or plane magnetic recording structure.

Japanese patent publication No. 2001-006121A discloses a technique for reducing the adverse effect of magnetic flux leakage from a thin-film magnetic head. According to the technique disclosed in Japanese patent publication No. 2001-006121A, the thin-film magnetic head has shunts at an end of its write head part facing a magnetic recording medium to pass leakage magnetic fluxes that may be recorded on the magnetic recording medium as write fringes through the shunts, and thus write fringes caused by the magnetic flux leakage at the recording gap can be reduced.

However, Japanese patent publication No. 2001-006121A merely discloses to guide leakage magnetic fluxes from the recording gap of the write head part to the shunts provided on both sides of the recording gap, but does not disclose leakage magnetic flux produced from a read head part of the thin-film magnetic head. Thus, the position of leakage magnetic fluxes disclosed in Japanese patent publication No. 2001-006121A differs completely from that of the present invention. In addition, the technique disclosed in Japanese patent publication No. 2001-006121A does not reduce flux leakage itself. Therefore, the known technique cannot be used for reducing magnetic flux leakage at the edges of the lower and upper shield layers of an MR read head element. In particular, it is difficult to provide the shunts described in Japanese patent publication No. 2001-006121A in the vicinity of the lower and upper shield layers of an MR read head element, due to limitations of space. Even if such shunts can be provided, it is difficult to reduce magnetic flux leakage at the edges of the lower and upper shield layers by the shunts.

SUMMARY OF THE INVENTION

It is therefore an object of the present invention to provide a thin-film magnetic head, a magnetic head assembly, a magnetic disk drive apparatus, and a thin-film magnetic disk head manufacturing method, whereby it is possible to prevent magnetic flux leakage from the edge of a lower and/or upper shield layer of a read head element.

According to the present invention, a thin-film magnetic head provided with at least one MR read head element includes a lower shield layer, an upper shield layer, and an MR layer formed between the lower shield layer and the upper shield layer. A profile of the upper shield layer, appeared at an ABS, has obtuse or rounded upper corners at end edges of the upper shield layer along a track-width direction.

The upper corners of the ABS of the upper shield layer are obtuse or rounded. Accordingly, the portion of the upper shield layer, exposed at the ABS, does not have a sharp profile even though the upper shield layer is thin. Consequently, magnetic fields do not concentrate at the end edge of the upper shield layer that is exposed at the ABS and therefore magnetic flux leakage from the end edge can be prevented. Thus, adverse effects such as an unwanted write from that portion onto a magnetic medium are prevented.

According to the present invention, also, a thin-film magnetic head provided with at least one MR read head element includes a lower shield layer, an upper shield layer, and an MR layer formed between the lower shield layer and the upper shield layer. A profile of the lower shield layer, appeared at the ABS, has obtuse or rounded lower corners at end edges of the lower shield layer along a track-width direction.

The lower corners of the ABS of the lower shield layer are obtuse or rounded. Accordingly, the portion of the lower shield layer that is exposed at the ABS does not have a sharp profile even though the lower shield layer is thin. Consequently, magnetic fields do not concentrate at the end edge of the lower shield layer that is exposed at the ABS and therefore magnetic flux leakage from the end edge can be prevented.

Thus, adverse effects such as an unwanted write from that portion onto a magnetic medium are prevented.

According to the present invention, further, a thin-film magnetic head provided with at least one MR read head element includes a lower shield layer, an upper shield layer, and an MR layer formed between the lower shield layer and the upper shield layer. A profile of combination of the lower shield layer and the upper shield layer, appeared at the ABS, has obtuse or rounded lower corners and obtuse or rounded upper corners at end edges of the upper and lower shield layers along a track-width direction.

The upper corners of the upper shield layer along the track-width direction, appeared at the ABS, and the lower corners of the lower shield layer along the track-width direction, appeared at the ABS, are obtuse or rounded. Magnetic flux leakage caused by concentration of magnetic fluxes at the end edges of the lower or upper shield layer can be reduced to some extent by forming the upper corners of the upper shield layer or the lower corners of the lower shield layer into an obtuse or rounded shape. However, it is most effective to form both of the upper corners of the upper shield layer and the lower corners of the lower shield layer into an obtuse or rounded shape so that the end edges exposed at the ABS have no sharp profile, because magnetic flux leakage at the end edges of both upper and lower shield layers can be almost completely prevented and unwanted writes from the end edges onto a magnetic medium can be completely prevented.

It is preferred that the magnetic head further includes an inductive write head element formed on the MR read head element. In this case, the inductive write head element may be a perpendicular-magnetic-recording write head element.

According to the present invention, still further, a magnetic head assembly includes the above-mentioned thin-film magnetic head and a support member for supporting the thin-film magnetic head. Here, the magnetic head assembly means an assembly mechanically and electrically assembling a thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

According to the present invention, still further, a magnetic disk drive apparatus including at least one magnetic disk, and a magnetic head assembly having a thin-film magnetic head and a support member for supporting the thin-film magnetic head provided with at least one MR read head element is provided.

Furthermore, according to the present invention, a method for manufacturing a thin-film magnetic head provided with at least one MR read head element having a lower shield layer, an upper shield layer, and an MR layer formed between the lower shield layer and the upper shield layer, includes a step of forming a resist mask for the upper shield layer, a step of depositing a film for the upper shield layer on the formed resist mask, and a step of lifting off the resist mask to form the upper shield layer having a profile, appeared at the ABS, of obtuse or rounded upper corners at the end edges along a track-width direction.

Concentration of magnetic fields at the end edges of the upper shield layer can be reduced by forming the upper shield layer by lift-off. That is, magnetic flux leakage at the end edges of the upper shield layer that would otherwise occur at the ABS can be prevented and a thin-film magnetic head that does not cause an unwanted write onto a magnetic medium can be provided by making a simple modification to the manufacturing process.

It is preferred that the method further includes a step of depositing an insulation layer, a step of forming a resist mask for a lower shield layer on the insulation layer, a step of removing a part of the insulation layer by wet etching through the formed resist mask, a step of removing the resist mask and then forming a film for the lower shield layer, and a step of planarizing the upper surface of the formed film for the lower shield layer to form the lower shield layer having a profile, appeared at the ABS, of obtuse or rounded lower corners at the end edges along a track-width direction.

It is also preferred that the method further includes a step of forming a resist mask for plating on the insulation layer, and a step of plating the lower shield layer using the formed resist mask. In this case, it is more preferred that the method further includes a step of forming an electrode film for plating before forming the resist mask for plating.

It is further preferred that the method further includes a step of forming a first resist mask for a lower shield layer on the insulation layer, a step of removing a part of the insulation layer by milling through the formed first resist mask, a step of removing the first resist mask and then forming a second resist mask for the lower shield layer, and a step of plating the lower shield layer using the formed second resist mask to have a profile, appeared at the ABS, of obtuse or rounded lower corners at the end edges along a track-width direction. In this case, preferably, the method further includes a step of forming an electrode film for plating before forming the second resist mask for plating.

Further objects and advantages of the present invention will be apparent from the following description of the preferred embodiments of the invention as illustrated in the accompanying drawings.

DESCRIPTION OF THE PREFERRED EMBODIMENTS

Figure 1:
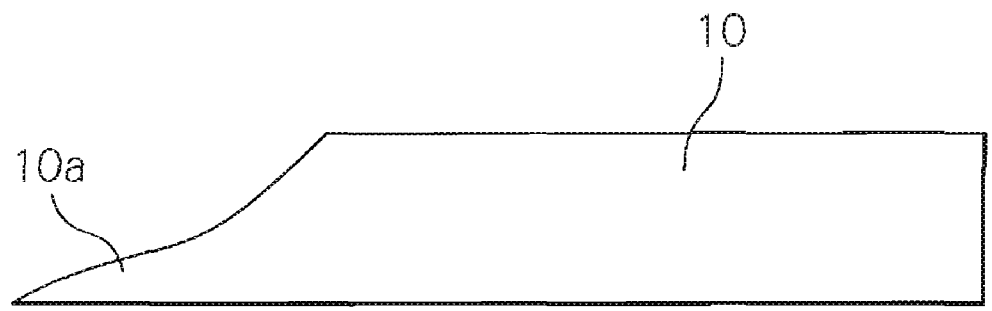
FIG. 1 is a cross-sectional view illustrating an end edge of a lower shield layer fabricated as a thin film, viewed from the ABS side of a thin-film magnetic head.
Figure 2:
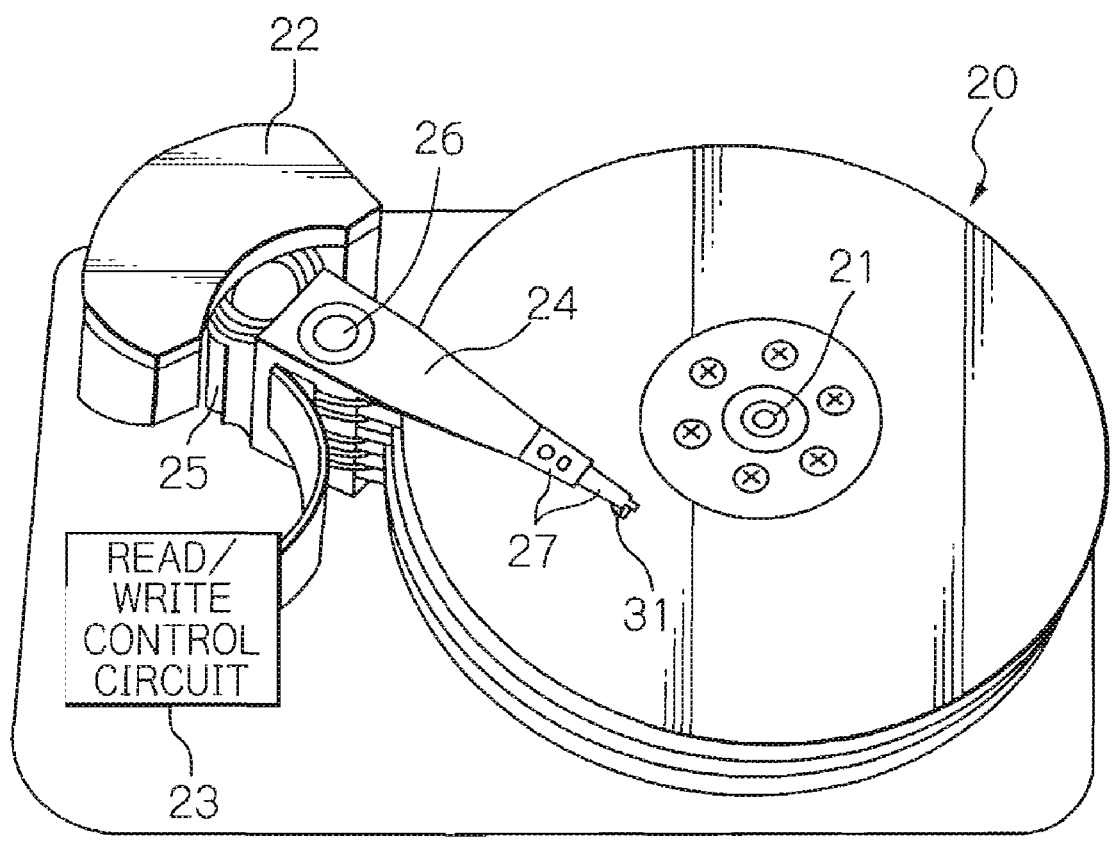
FIG. 2 is a perspective view schematically illustrating a configuration of the main components of a magnetic disk drive apparatus according to an embodiment of the present invention.
Figure 3:
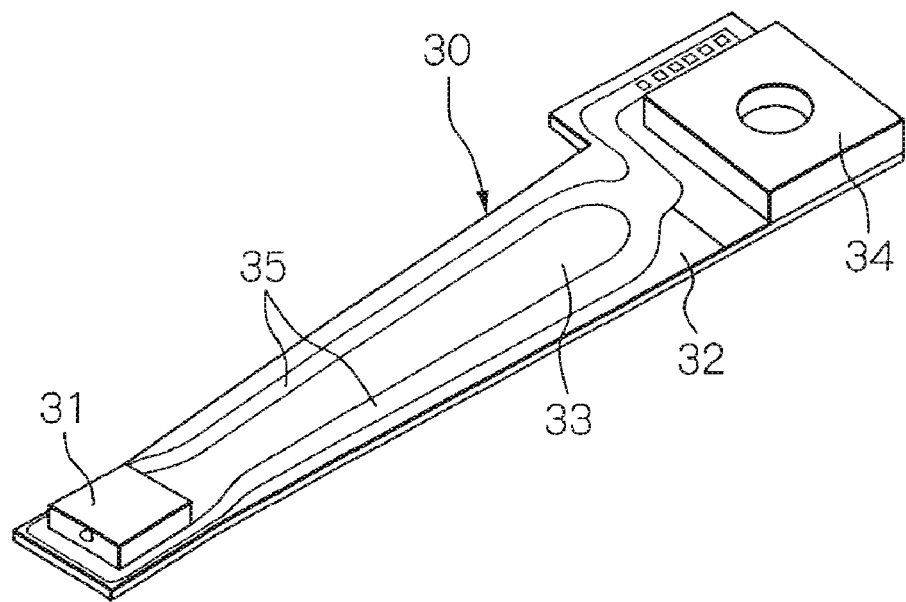
FIG. 3 is a perspective view illustrating an exemplary configuration of an HGA shown in FIG. 2.
Figure 4:
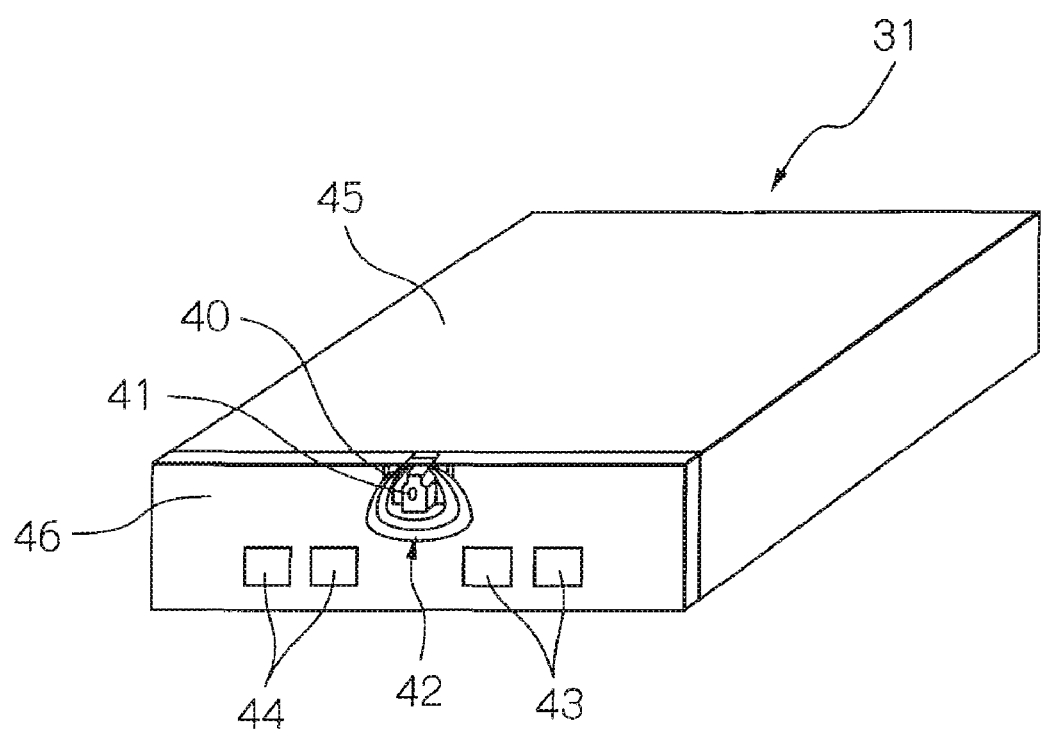
FIG. 4 is a perspective view illustrating a thin-film magnetic head attached to an end of the HGA shown in FIG. 3.

FIG. 2 schematically illustrates main components of a magnetic disk drive apparatus according to one embodiment of the present invention, FIG. 3 illustrates an exemplary configuration of an HGA, and FIG. 4 illustrates a thin-film magnetic head attached to an end of the HGA shown in FIG. 3.

In FIG. 2, reference numeral 20 denotes multiple magnetic disks that rotate about a rotation axis of a spindle motor 21, 22 denotes an assembly carriage device for positioning a thin-film magnetic head or magnetic head slider above a track, and 23 denotes a read/write control circuit for controlling read/write operations of the thin-film magnetic head.

Provided in the assembly carriage device 22 are a plurality of drive arms 24. The drive arms 24 are stacked along a pivot bearing axis 26 and driven by a voice coil motor (VCM) 25 to angular-pivot about the axis 26. An HGA 27 is attached at the end of each drive arm 24. Provided on each HGA 27 is a magnetic head slider 31 in such a manner that it faces the surface of each magnetic disk 20. In modification, a single magnetic disk 20, a single drive arm 24 and a single HGA 27 may be provided on the magnetic disk drive apparatus.

As shown in FIG. 3, the HGA consists of a suspension 30, the magnetic head slider 31 provided with an inductive write head element and a multi-layered MR read head element and fixed at the end of the suspension 30, and a wiring member 35. Terminal electrodes of the thin-film magnetic head 31 are electrically connected to one end of the wiring member 35.

The suspension 30 mainly consists of a load beam 32 generating loads applied to the magnetic head slider 31, a resilient flexure 33 fixed on and supported by the load beam 32, a base plate 34 provided on the base of the load beam 32, and a wiring member 35 which is provided on the flexure 33 and the load beam 32 and provided with trace conductors and connection pads electrically connected to the ends of the trace conductors.

It will be understood that the structure of the suspension in the magnetic head assembly of the present invention is not limited to the one described above. While not shown, a head drive IC chip may be attached on a position between the ends of the suspension 30.

As shown in FIG. 4, the magnetic head slider 31 has a composite magnetic head element consisting of an MR read head element 40 and an inductive write head element 41 stacked together, and four signal terminal electrodes 43 and 44 connected to the MR read head element 40 and the inductive write head 41, respectively, provided on an element formation surface 46, which is a side surface when an ABS 45 of the magnetic head slider is at the bottom.

Figure 5:
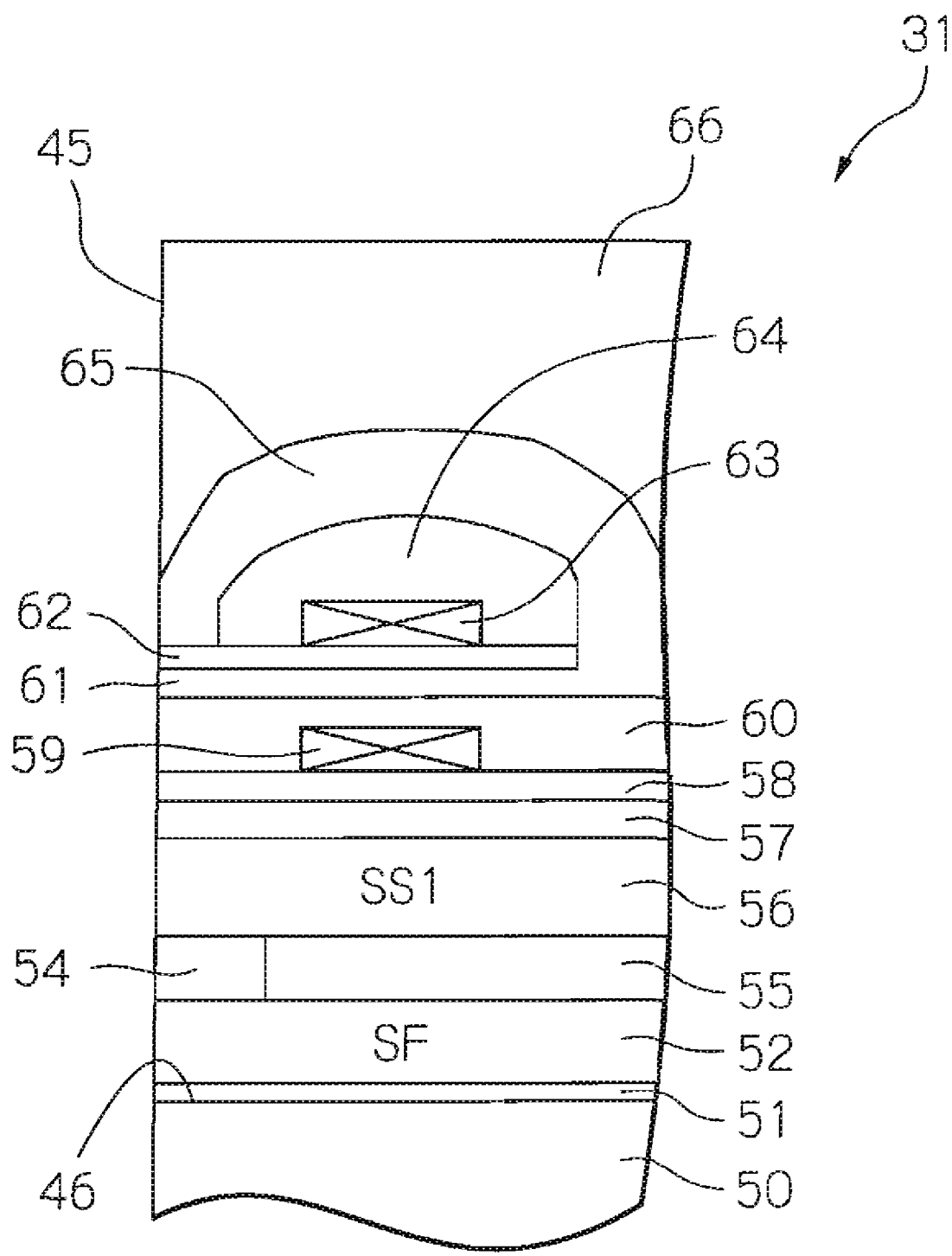
FIG. 5 is a central cross-sectional view schematically illustrating a structure of the thin-film magnetic head shown in FIG. 4.
Figure 6:
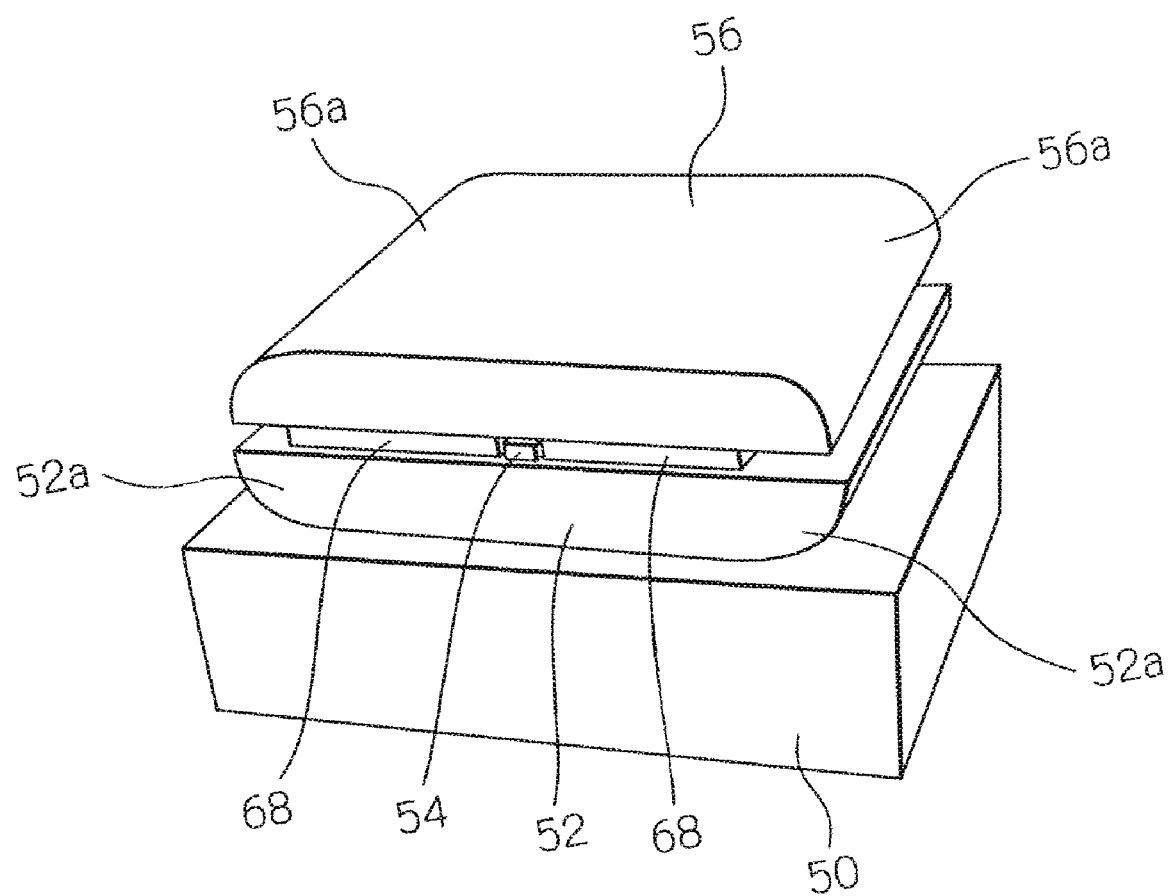
FIG. 6 is a perspective view illustrating the shapes of lower and upper shield layers of the thin-film magnetic head shown in FIG. 5.

FIG. 5 schematically illustrates the structure of the thin-film magnetic head according to the present embodiment, and FIG. 6 illustrates the shapes of a lower shield layer and an upper shield layer of the thin-film magnetic head. In this embodiment, the inductive write head element is a perpendicular-magnetic-recording structure write head element and the MR read head element is a TMR read head element. However, a GMR read head element having a CCP (Current Perpendicular to Plane) structure in which sense current flows in a direction perpendicular to the film planes has basically the same configuration as described above, except that a non-magnetic conducting layer is provided instead of a tunnel barrier layer.

The ABS 45 facing the surface of a magnetic disk in operation is formed on a slider substrate 50. During operation, the magnetic head slider 31 hydrodynamically flies above the surface of a rotating magnetic disk at a predetermined flying height. Formed on the element formation surface 46 of the slider substrate 50 is an underlying insulation layer 51, on which a lower shield layer (SF) 52 that also acts as a lower electrode layer is formed.

The lower corners 52a of the lower shield layer 52 along the track-width direction in this embodiment have a rounded shape as shown in FIG. 6.

Formed on the lower shield layer 52 are a TMR multi-layered structure 54 and an insulation layer 55.

The TMR multi-layered structure 54 has stacked layers of a magnetization fixed layer consisting of a pinned layer and a pin layer of an anti-ferromagnetic material, a tunnel barrier layer, and a magnetization free layer (free layer). It will be understood that the TMR multi-layered structure 54 may have any of various other layered structures. A magnetic domain control layer, not shown, is formed on both sides of the TMR multi-layered structure 54 for controlling the magnetic domain of the free layer.

Formed on the TMR multi-layered structure 54 and the insulation layer 55 is an upper shield layer (SS1) 56 that also acts as an upper electrode layer.

As shown in FIG. 6, the upper corners 56a of the upper shield layer 56 along the track-width direction in this embodiment also have a rounded shape.

The lower shield layer 52, the anti-ferromagnetic layer 53, the TMR multi-layered structure 54, the insulation layer 55, the upper shield layer 56, a magnetic domain control layer 68, a lead conductor layer (not shown), and another layers constitute the TMR read head element.

Formed on the upper shield layer 56 is a nonmagnetic intermediate layer 57 for isolating the TMR read head element from the inductive write head element formed thereon.

Namely, provided on the nonmagnetic intermediate layer 57 is the inductive write head element including an insulation layer 58, a backing coil layer 59, a backing coil insulation layer 60, a main magnetic pole layer 61, an insulation gap layer 62, a write coil layer 63, a write coil insulation layer 64, and an auxiliary magnetic pole layer 65. A protection layer 66 is formed on the inductive write head element.

In this embodiment, the lower corners 52a of the lower shield layer 52 along the track-width direction have a rounded shape and the upper corners 56a of the upper shield layer 56 along the track-width direction also have a rounded shape as shown in FIG. 6. Accordingly, even though the lower shield layer 52 and the upper shield layer 56 are thin, the portions that are exposed at the ABS do not have sharp profile. Consequently, magnetic fields do not concentrate at the end edges of the lower shield layer 52 and upper shield layer 56 that appear at the ABS. Therefore, magnetic flux leakage at the end edges of both shield layers can be prevented and an unwanted write onto a magnetic medium can be prevented.

While the lower corners 52a of portions of the lower shield layer 52 along the track-width direction that are exposed at the ABS and the upper corners 56a of portions of the upper shield layer 56 along the track-width direction that are exposed at the ABS are rounded, the corners of one or both of these shields may be formed in an obtuse angulated shape.

While a perpendicular-magnetic-recording structure inductive write head element is used in this embodiment, in modifications, an inductive write head element having a horizontal or plane-magnetic-recording structure may be used. Furthermore, it will be apparent that, in addition to the structure shown in FIG. 5, various other structures of the perpendicular-magnetic-recording structure inductive write head element may be adopted.

Furthermore, while it is stated in the foregoing description that this embodiment relates to a thin-film magnetic head having a TMR read head element and is also applicable to a thin-film magnetic head with a CPP-GMR read head element, the present invention is also applicable to a thin-film magnetic head with a GMR read head element of a CIP (Current In Plane) structure as well as a thin-film magnetic head with an anisotropic magnetoresistive effect (AMR) read head element of a single layer structure.

Figure 7:
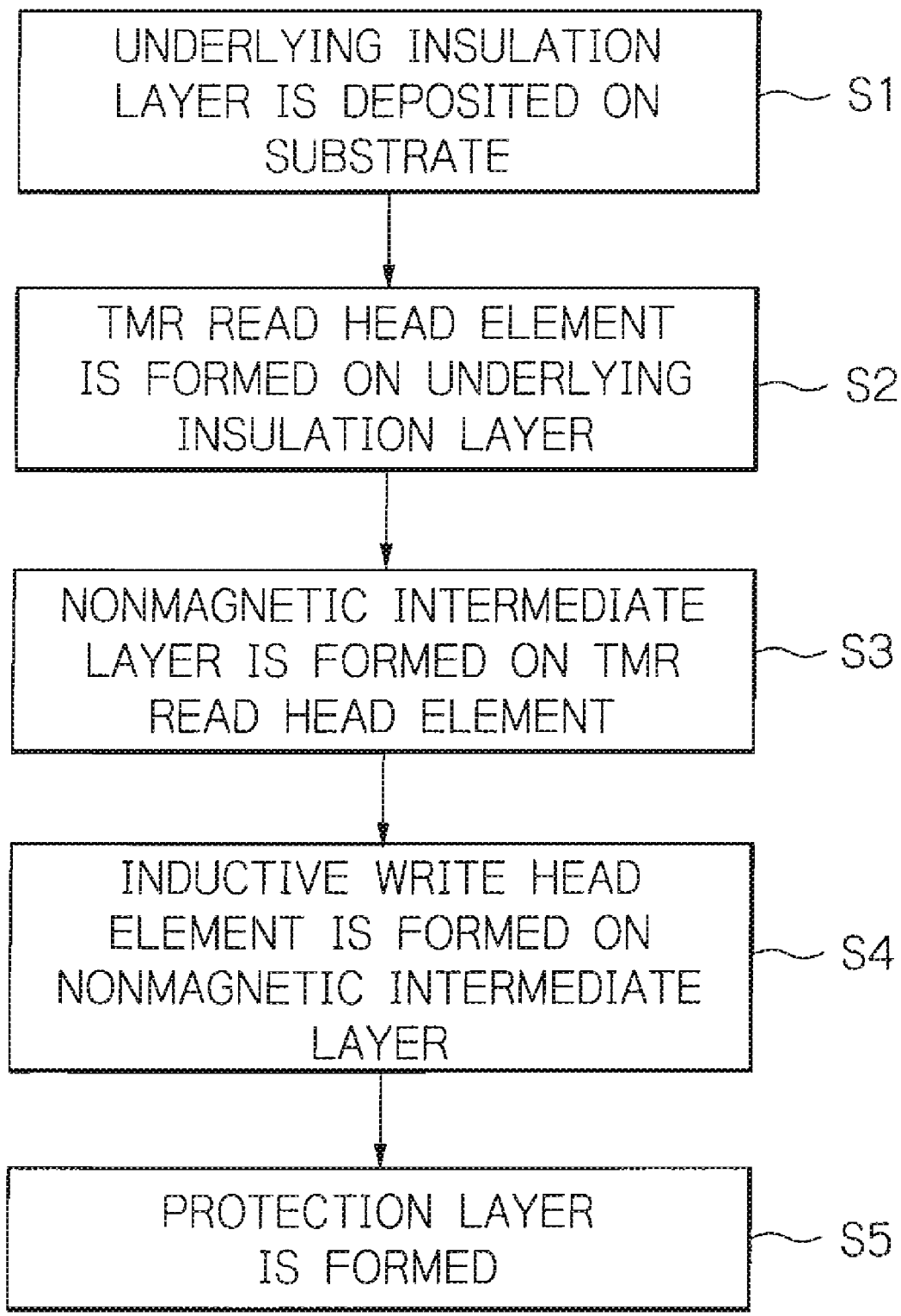
FIG. 7 is a flowchart illustrating a process for manufacturing the thin-film magnetic head shown in FIG. 5.

A process for manufacturing a thin-film magnetic head will be described below. FIG. 7 is a flowchart illustrating a process for manufacturing a thin-film magnetic head.

As shown in FIGS. 7 and 5, a substrate or wafer 50 made of a conductive material such as AlTic ($Al_2O_3$—TiC) is provided first, and an underlying insulation layer 51 of an insulation material such as alumina ($Al_2O_3$) or silicon oxide ($SiO_2$) is deposited on the substrate 50 to have a thickness in the range from approximately 0.05 to 10 μm by sputtering for example (Step S1).

Then, on the underlying insulation layer 51, a TMR read head element including a lower shield layer 52, an anti-ferromagnetic layer 53, a TMR multi-layered structure 54, an insulation layer 55, a magnetic domain control bias layer (not shown), and an upper shield layer 56 is formed (Step S2). A process for manufacturing the TMR read head element will be described later in detail.

Then, a nonmagnetic intermediate layer 57 is formed on the TMR read head element (Step S3). The nonmagnetic intermediate layer 57 is made of an insulation material such as $Al_2O_3$, $SiO_2$, aluminum nitride (AlN) or diamond-like carbon (DLC), or a metal material such as titanium (Ti), tantalum (Ta) or platinum (Pt) to have a thickness in the range from approximately 0.1 to 0.5 μm by using sputtering or chemical vapor deposition (CVD) for example.

Then, on the nonmagnetic intermediate layer 57, an inductive write head element including an insulation layer 58, a backing coil layer 59, a backing coil insulation layer 60, a main magnetic pole layer 61, an insulation gap layer 62, a write coil layer 63, a write coil insulation layer 64, and an auxiliary magnetic pole layer 65 is formed (Step S4).

The insulation layer 58 can be formed by depositing an insulation material such as $Al_2O_3$ or $SiO_2$ on the nonmagnetic intermediate layer 57 by using sputtering, for example. The upper surface of the insulation layer 58 is planarized by chemical mechanical polishing (CMP) for example, as required. Formed on the insulation layer 58 is the baking coil layer 59 of a conductive material such as copper (Cu) by frame plating for example to have a thickness in the range from approximately 1 to 5 μm. The purpose of the backing coil layer 59 is to guide a write magnetic flux so as to prevent adjacent track erasure (ATE). The backing coil insulation layer 60 is formed from a thermoset novolac-type resist to have a thickness in the range from approximately 0.5 to 7 μm by photolithography so as to cover the backing coil layer 59.

The main magnetic pole layer 61 is formed on the backing coil insulation layer 60. The main magnetic pole layer 61 acts as a magnetic path for converging and guiding a magnetic flux induced by the write coil layer 63 to a perpendicular-magnetic-recording layer of a magnetic disk on which data is to be written. The main magnetic pole layer 61 is formed of a metal magnetic material such as FeAlSi, NiFe, CoFe, NiFeCo, FeN, FeZrN, FeTaN, CoZrNb or CoZrTa, or a multi-layered film including any of these materials to have a thickness in the range from approximately 0.5 to 3 μm by frame plating for example.

The insulation gap layer 62 is formed on the main magnetic pole layer 61 by depositing an insulation film of a material such as $Al_2O_3$ or $SiO_2$ by sputtering for example. Formed on the insulation gap layer 62 is the write coil insulation layer 64 of a thermoset novolac-type resist for example with a thickness in the range from approximately 0.5 to 7 μm. The write coil layer 63 of a conductive material such as Cu with a thickness of approximately 1 to 5 μm is formed inside the write coil insulation layer 64 by frame plating for example.

The auxiliary magnetic pole layer 65 of a metal magnetic material such as FeAlSi, NiFe, CoFe, NiFeCo, FeN, FeZrN, FeTaN, CoZrNb or CoZrTa, or a multi-layered film of any of these materials with a thickness of approximately 0.5 to 3 μm is formed by frame plating for example so as to cover the write coil insulation layer 64. This auxiliary magnetic pole layer 65 forms a return yoke.

Then, the protection layer 66 is formed on the inductive write head element (Step S5). The protection layer 66 may be formed by depositing a material such as $Al_2O_3$ or $SiO_2$ using sputtering.

This completes the wafer process for manufacturing the thin-film magnetic head. The subsequent processes for manufacturing the thin-film magnetic head such as machining process and polishing process are well known and therefore the description of which will be omitted.

Figure 8:
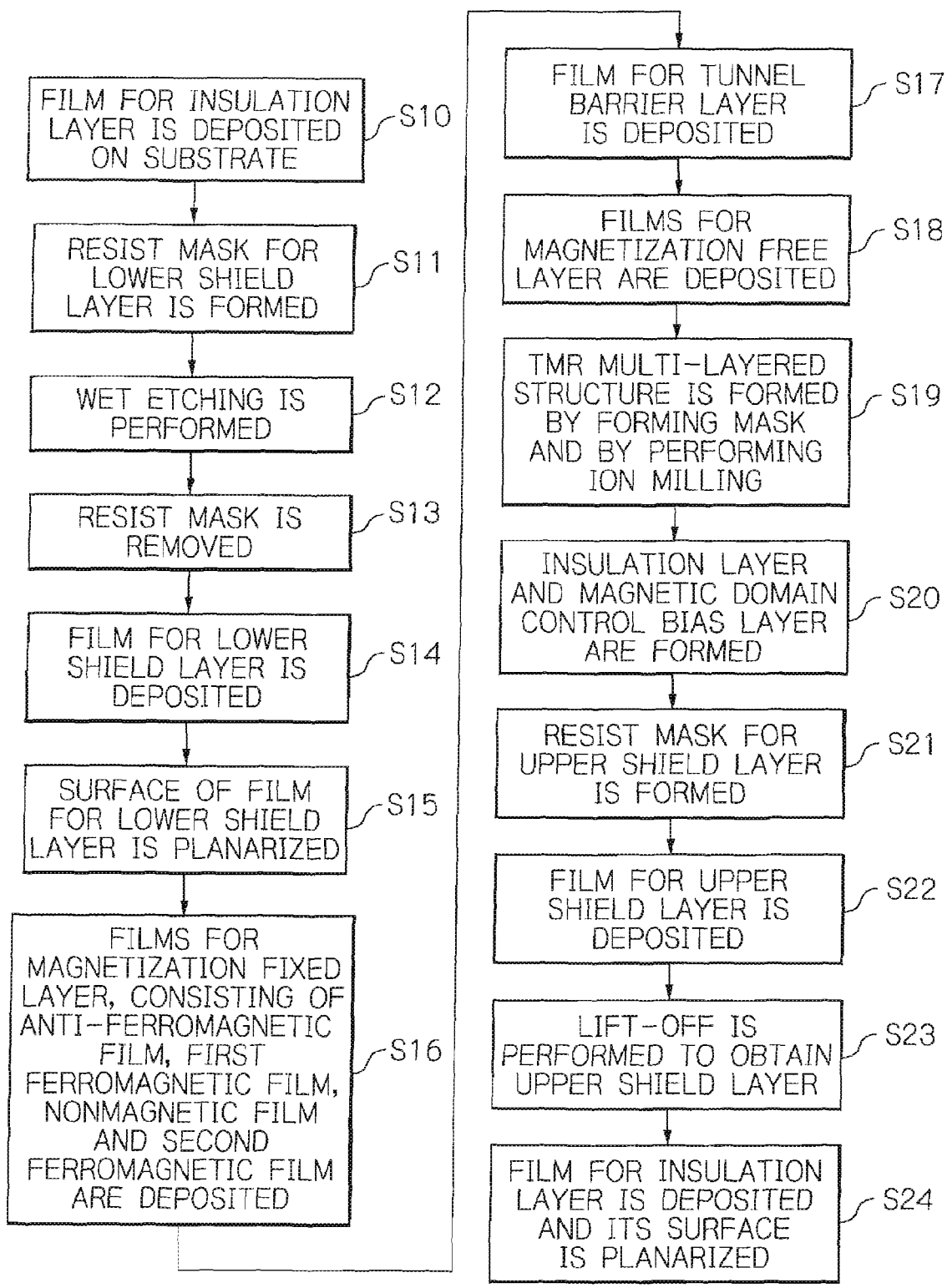
FIG. 8 is a flowchart illustrating in detail an exemplary process for manufacturing a read head element in the thin-film magnetic head manufacturing process shown in FIG. 7.

A process for manufacturing the TMR read head element will be described below. FIG. 8 illustrates in detail an exemplary of process flow for manufacturing a TMR read head element in the thin-film magnetic head manufacturing process shown in FIG. 7, and FIGS. 9a to 9k schematically illustrate cross sections of the TMR read head element fabricated by the manufacturing process sequence shown in FIG. 8.

Figure 9A:
FIGS. 9a to 9k are cross-sectional views schematically illustrating the manufacturing process sequence shown in FIG. 8.

First, a film 71' for an insulation layer is deposited on the underlying insulation layer 51 (not shown in FIG. 9a) on the substrate 50 as shown in FIG. 9a (Step S10).

Figure 9B:
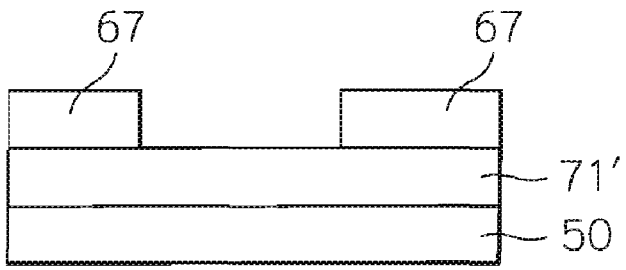

Then, a resist mask 67 having a pattern for a lower shield layer is formed on the film 71' for an insulation layer as shown in FIG. 9b (Step S11).

Figure 9C:
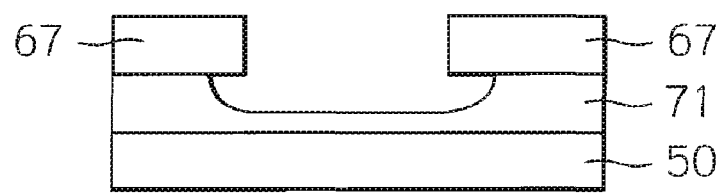
Figure 9D:
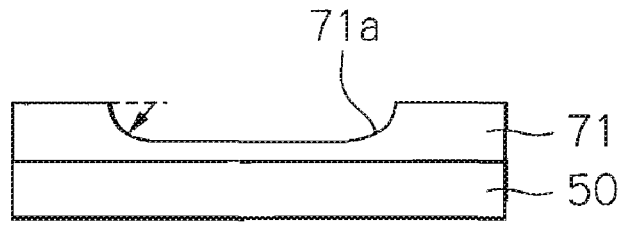

Isotropic wet etching is performed through the resist mask 67 as shown in FIG. 9c (Step S12), and then the resist mask 67 is removed (Step S13) to obtain an insulation layer 71 having a recess 71a in its upper surface as shown in FIG. 9d.

Figure 9E:
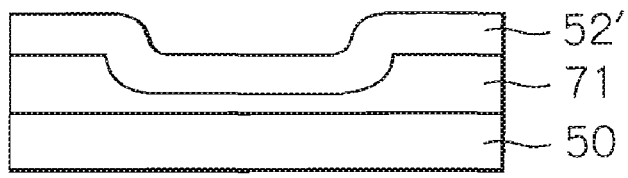

Then, a film 52' for a lower shield layer is deposited as shown in FIG. 9e (Step S14). The film 52' for a lower shield layer can be formed by sputtering a metal magnetic material such as FeAlSi, NiFe, CoFe, FeNiCo, FeN, FeZrN, FeTaN, CoZrNb or CoZrTa to have a thickness in the range from approximately 0.1 to 3 μm.

Figure 9F:
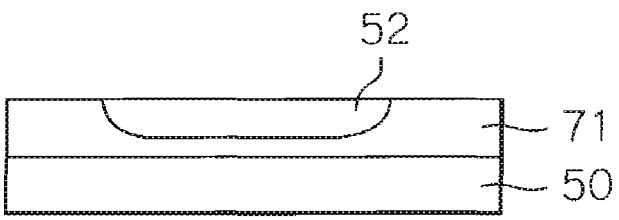

The surfaces of the film 52' for a lower shield layer and the insulation layer 71 are planarized by CMP as shown in FIG. 9f to obtain a lower shield layer 52 (Step S15).

Then, a TMR multi-layered structure 54, a magnetic domain control layer 68, and an insulation layer 54 are formed on the lower shield layer 52 and the insulation layer 71 as follows.

First, films for a magnetization fixed layer are deposited on the lower shield layer 52 and the insulation layer 71 (Step S16). The films for magnetization fixed layer in this embodiment are of synthetic type, deposited by sputtering an antiferromagnetic film (film for a pin layer) of a material such as IrMn, PtMn, NiMn or RuRhMn with a thickness of approximately 5 to 30 nm, a first ferromagnetic film of a material such as CoFe with a thickness of approximately 1 to 5 nm, a nonmagnetic film of one of or an alloy of two or more of materials such as ruthenium (Ru), rhodium (Rh), iridium (Ir), chromium (Cr), rhenium (Re) and copper (Cu) with a thickness of approximately 0.8 nm, and a second ferromagnetic film of a material such as CoFe, CoFeSi, CoMnGe, CoMnSi or CoMnAl with a thickness of approximately 1 to 3 nm, in this order.

The anti-ferromagnetic material film for the pin layer is deposited by applying a magnetic filed into the layer plane in a direction perpendicular to the ABS, that is in a direction perpendicular to the magnetization direction of the free layer of the TMR multi-layered structure, at a temperature higher than the blocking temperature of the anti-ferromagnetic material. In modifications, the magnetization direction of the pin layer may be fixed by performing annealing under magnetic field in a process separated from the deposition.

Then, a film for a tunnel barrier layer of an oxide of aluminum (Al), titanium (Ti), Ta, Zr, Hf, magnesium (Mg), silicon (Si) or zinc (Zn) with a thickness of approximately 0.5 to 1 nm is deposited on the film for a magnetization fixed layer (Step S17).

Then, films for a free layer are formed on the film for a tunnel barrier layer by depositing a high-polarizability film of a material such as CoFe, CoFeSi, CoMnGe, CoMnSi or CoMnAl with a thickness of approximately 1 nm and a soft magnetic film of a material such as NiFe with a thickness of approximately 1 to 9 nm in this order by sputtering for example (Step S18). During the deposition of the films for a free layer, a magnetic field is applied to control the magnetization direction.

Then, the TMR multi-films thus formed is patterned (Step S19). First, a mask (not shown) having a resist pattern for lift-off is formed on the TMR multi-films and ion milling is performed through the mask. As a result of the ion milling, a TMR multi-layered structure 54 consisting of multiple layers including a magnetization fixed layer, a tunnel barrier layer and a magnetization free layer, in this order from the bottom, can be obtained.

Figure 9G:
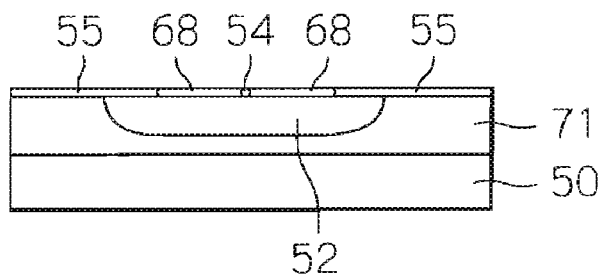

Then, a film for an insulation layer of an insulation material such as $Al_2O_3$ or $SiO_2$ is deposited on the TMR multi-layered structure 54 to have a thickness in the range from approximately 3 to 20 nm by sputtering or IBD (ion beam deposition) for example, and a film for a magnetic domain control bias layer is deposited by sputtering or IBD for example to have a thickness in the range from approximately 10 to 40 nm. Thereafter, lift-off is performed by removing the mask. As a result, a magnetic domain control bias layer 68 and an insulting layer 55 are formed on the side surfaces of the TMR multi-layered structure 54 (Step S20). FIG. 9g shows this state.

Figure 9H:
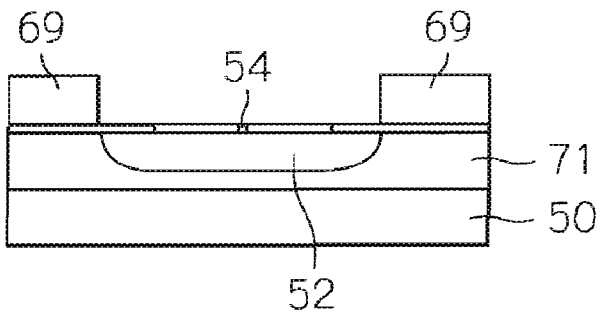

Then, a resist mask 69 having a pattern for forming an upper shield layer is formed thereon as shown in FIG. 9h (Step S21).

Figure 9I:
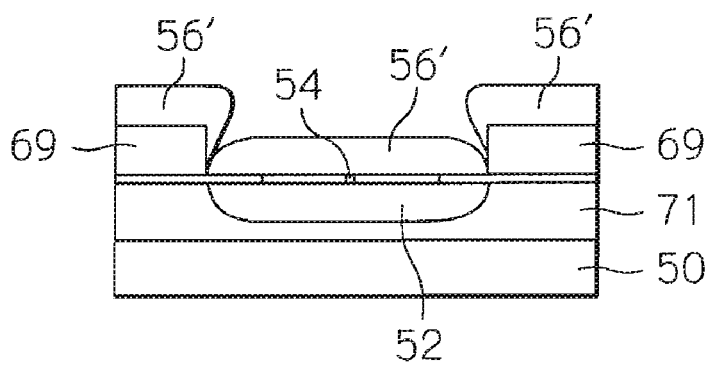

Then, a film 56' for an upper shield layer is deposited as shown in FIG. 9i (Step S22). The film 56' for an upper shield layer is deposited by sputtering a metal magnetic material such as FeAlSi, NiFe, CoFe, FeNiCo, FeN, FeZrN, FeTaN, CoZrNb or CoZrTa to have a thickness in the range from approximately 0.1 to 3 µm.

Figure 9J:
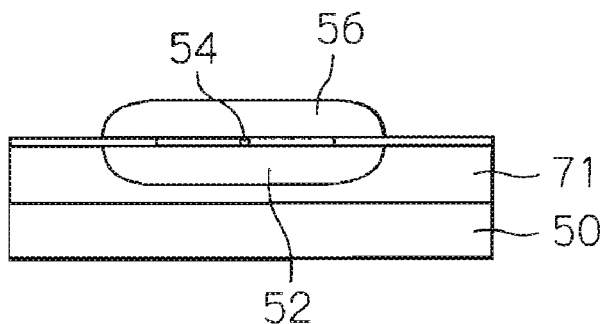

Then, lift-off is performed by removing the mask 69 to obtain the upper shield layer 56 as shown in FIG. 9j (Step S23).

Figure 9K:
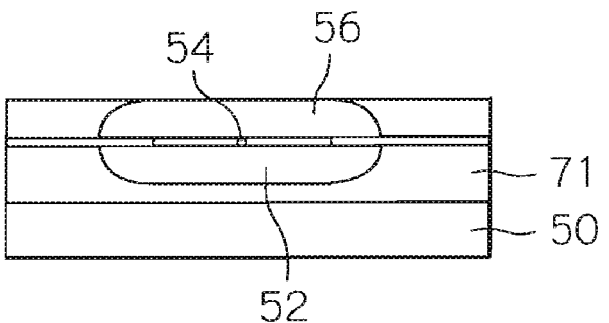

Thereafter, a film for an insulation layer of an insulation material such as $Al_2O_3$ or $SiO_2$ is deposited on the upper shield layer 56 by sputtering for example and the surface of the film is planarized by CMP for example (Step S24). FIG. 9k shows this state.

The films of the magnetization fixed layer, the barrier layer and the magnetization free layer that constitute the magneto-sensitive portion of the TMR multi-layered structure 54 are not limited to the configurations described above, but various materials and thicknesses may be used. For example, the magnetization fixed layer is not limited to the four-layered structure of three films and an anti-ferromagnetic film, but may have a two-layered structure of a ferromagnetic film and an anti-ferromagnetic film, or a multi-layered structure of more or less than four films. The magnetization free layer is not limited to the two-layered structure, but may have a single-layer structure without the high-polarizability film, or a multi-layered structure of more than three films including a magnetostriction control film. Furthermore, the magnetization fixed layer, barrier layer and magnetization free layer of the magneto-sensitive portion may be laminated in the inverse order, that is, in the order of the magnetization free layer, the barrier layer and the magnetization fixed layer from the bottom. In that case, the anti-ferromagnetic film in the magnetization fixed layer is positioned at the top.

In the exemplary process for manufacturing the TMR read head element described above, both of the lower shield layer 52 and the upper shield layer 56 are formed by using a dry fabrication process such as sputtering and therefore these layers are formed considerably thin. However, according to this embodiment, both of the lower corners 52a of the lower shield layer 52 along the track-width direction and the upper corners 56a of the upper shield layer 56 along the track-width direction are formed to have a rounded shaped. Thus, the portions exposed at the ABS are rounded with no sharp profile and therefore magnetic fields do not concentrate at the end edges that appear at the ABS of the lower shield layer 52 and the upper shield layer 56. As a result, magnetic flux leakage at the end edges can be prevented and an unwanted write to a magnetic medium can be prevented.

Figure 10:
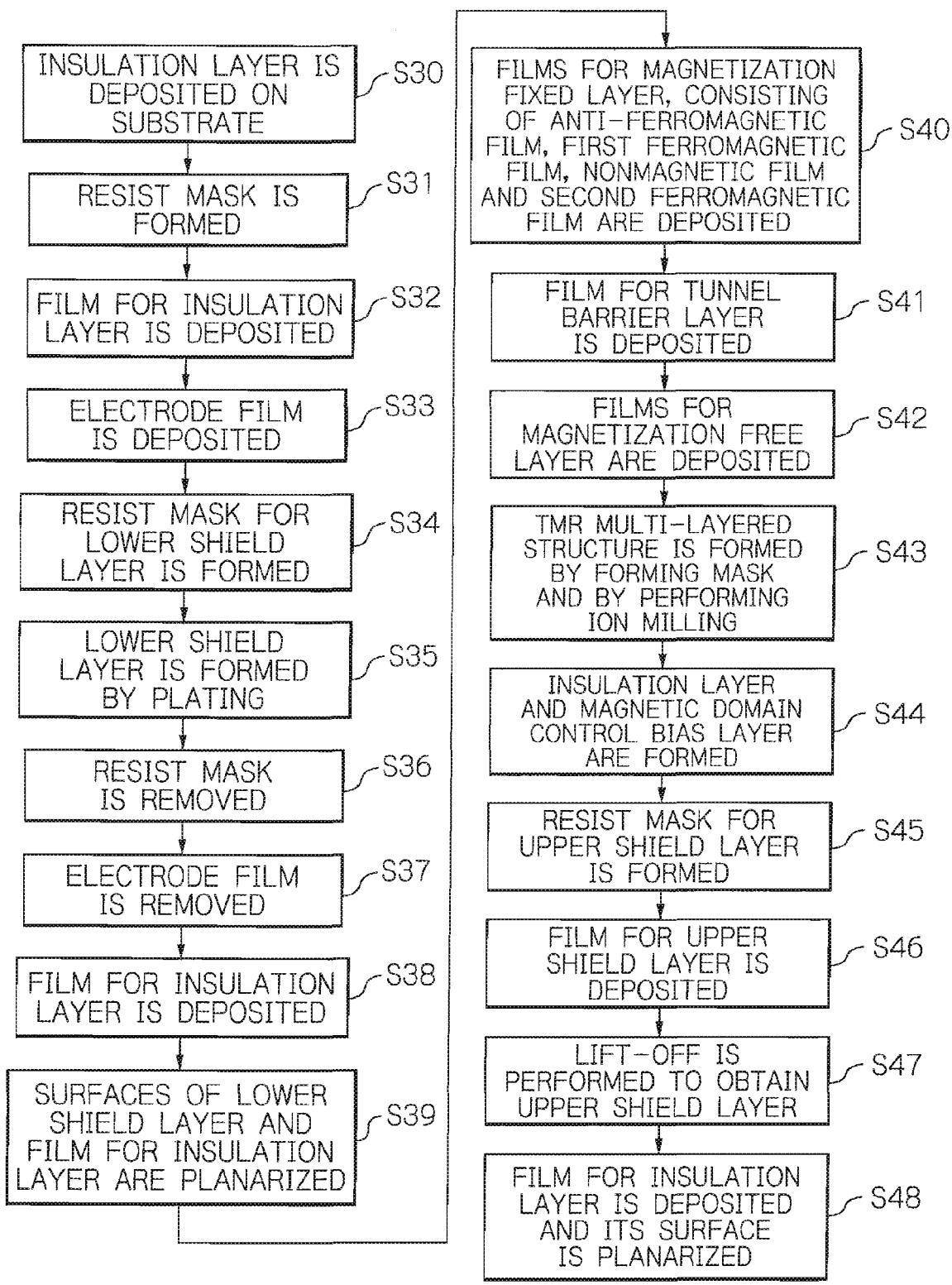
FIG. 10 is a flowchart illustrating in detail another exemplary process for manufacturing a read head element in the thin-film magnetic head manufacturing process shown in FIG. 7.

FIG. 10 illustrates in detail another exemplary of process flow for manufacturing a TMR read head element in the thin-film magnetic head manufacturing process shown in FIG. 7, and FIGS. 11a to 11l schematically illustrate cross sections of the TMR read head element fabricated by the manufacturing process sequence shown in FIG. 10. In the following description, components equivalent to those in the example shown in FIG. 8 and FIGS. 9a to 9k are labeled the same reference numerals even if their structures are somewhat different.

Figure 11A:
FIGS. 11a to 11l are cross-sectional views schematically illustrating the manufacturing process sequence shown in FIG. 10.

First, an underlying insulation layer 51 is deposited on a substrate 50 as shown in FIG. 11a (Step S30).

Figure 11B:
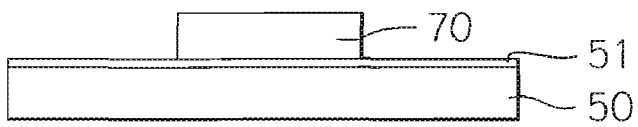

Then, a resist mask 70 having a pattern for forming the profile of the ABS section of a lower shield layer is formed on the underlying insulation layer 51 as shown in FIG. 11b (Step S31).

Figure 11C:
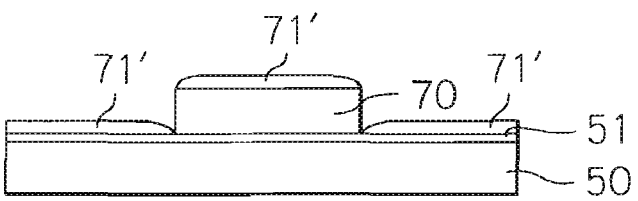

Then, a film 71' for an insulation layer of an insulation material such as $Al_2O_3$ or $SiO_2$ is deposited through the resist mask 70 by sputtering for example as shown in FIG. 11c (Step S32).

Figure 11D:

The resist mask 70 is then removed and an electrode film 72 for Cu plating is deposited by sputtering for example as shown in FIG. 11d (Step S33).

Figure 11E:
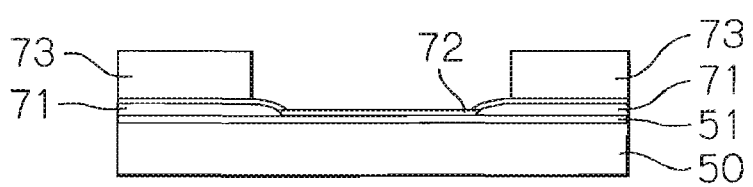

Then, a resist mask 73 for a lower shield layer is formed on the electrode film 72 as shown in FIG. 11e (Step S34).

Figure 11F:
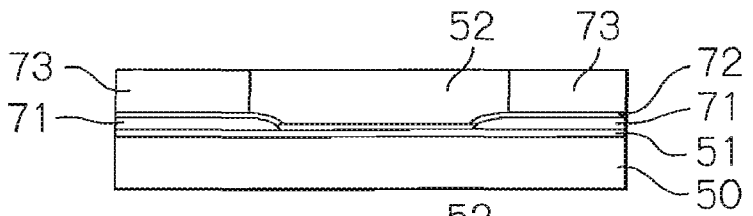

Then, the lower shield layer 52 is plated using the resist mask 73 as a frame as shown in FIG. 11f (Step S35). The lower shield layer 52 is formed by the frame plating with a metal magnetic material such as FeAlSi, NiFe, CoFe, FeNiCo, FeN, FeZrN, FeTaN, CoZrNb or CoZrTa to have a thickness in the range from approximately 0.1 to 3 µm.

Figure 11G:
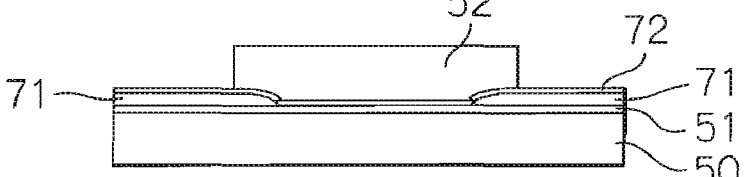

Then, the resist mask 73 is removed as shown in FIG. 11g (Step S36).

Figure 11H:
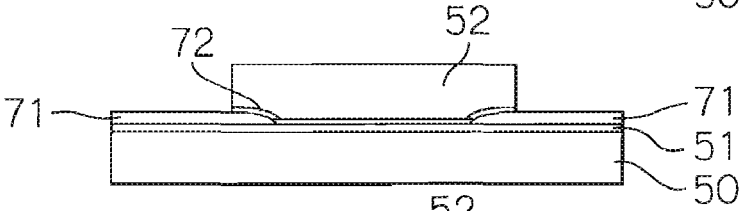

Thereafter, the exposed portion of the electrode film 72 is removed by milling for example as shown in FIG. 11h (Step S37).

Figure 11I:
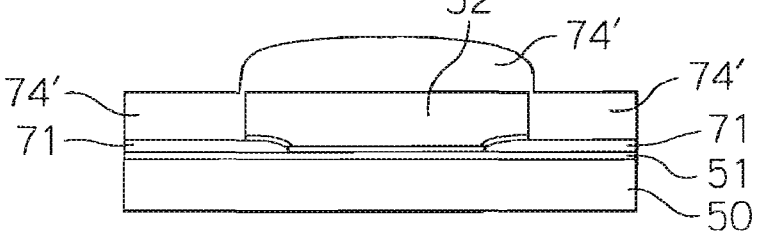

Then, a film 74' for an insulation layer of an insulation material such as $Al_2O_3$ or $SiO_2$ is deposited by sputtering for example as shown in FIG. 11i (Step S38).

Figure 11J:
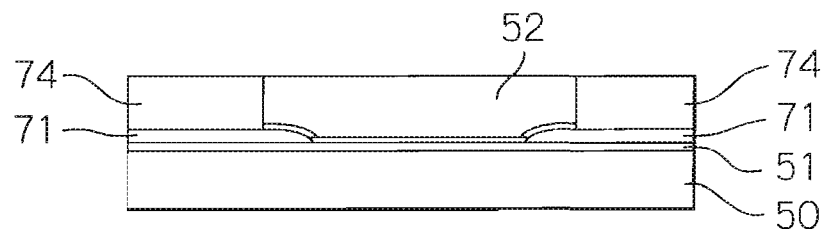

The surfaces of the lower shield layer 52 and the film for an insulation layer 74' are then planarized by CMP for example as shown in FIG. 11j (Step S39).

Then, a TMR multi-layered structure 54, a magnetic domain control layer 68, and an insulation layer 54 are formed on the lower shield layer 52 and insulation layer 74 as follows.

First, films for a magnetization fixed layer are deposited on the lower shield layer 52 and the insulation layer 74 (Step S40). The films for magnetization fixed layer in this embodiment are of synthetic type, deposited by sputtering an anti-ferromagnetic film (film for a pin layer) of a material such as IrMn, PtMn, NiMn or RuRhMn with a thickness of approximately 5 to 30 nm, a first ferromagnetic film of a material such as CoFe with a thickness of approximately 1 to 5 nm, a nonmagnetic film of one of or an alloy of two or more of materials such as Ru, Rh, Ir, Cr, Re and Cu with a thickness of approximately 0.8 nm, and a second ferromagnetic film of a material such as CoFe, CoFeSi, CoMnGe, CoMnSi or CoMnAl with a thickness of approximately 1 to 3 nm, in this order.

The anti-ferromagnetic material film for the pin layer is deposited by applying a magnetic filed into the layer plane in a direction perpendicular to the ABS, that is in a direction perpendicular to the magnetization direction of the free layer of the TMR multi-layered structure, at a temperature higher than the blocking temperature of the anti-ferromagnetic material. In modifications, the magnetization direction of the pin layer may be fixed by performing annealing under magnetic field in a process separated from the deposition.

Then, a film for a tunnel barrier layer of an oxide of Al, Ti, Ta, Zr, Hf, Mg, Si or Zn with a thickness of approximately 0.5 to 1 nm is deposited on the film for a magnetization fixed layer (Step S41).

Then, films for a free layer are formed on the film for a tunnel barrier layer by depositing a high-polarizability film of a material such as CoFe, CoFeSi, CoMnGe, CoMnSi or CoMnAl with a thickness of approximately 1 nm and a soft magnetic film of a material such as NiFe with a thickness of approximately 1 to 9 nm in this order by sputtering for example (Step S42). During the deposition of the films for a free layer, a magnetic field is applied to control the magnetization direction.

Then, the TMR multi-films thus formed is patterned (Step S43). First, a mask (not shown) having a resist pattern for lift-off is formed on the TMR multi-films and ion milling is performed through the mask. As a result of the ion milling, a TMR multi-layered structure 54 consisting of multiple layers including a magnetization fixed layer, a tunnel barrier layer and a magnetization free layer, in this order from the bottom, can be obtained.

Then, a film for an insulation layer of an insulation material such as $Al_2O_3$ or $SiO_2$ is deposited on the TMR multi-layered structure 54 to have a thickness in the range from approximately 3 to 20 nm by sputtering or IBD for example, and a film for a magnetic domain control bias layer is deposited by sputtering or IBD for example to have a thickness in the range from approximately 10 to 40 nm. Thereafter, lift-off is performed by removing the mask. As a result, a magnetic domain control bias layer 68 and an insulting layer 55 are formed on the side surfaces of the TMR multi-layered structure 54 (Step S44).

Then, a resist mask 69 having a pattern for forming an upper shield layer is formed thereon (Step S45).

Figure 11K:
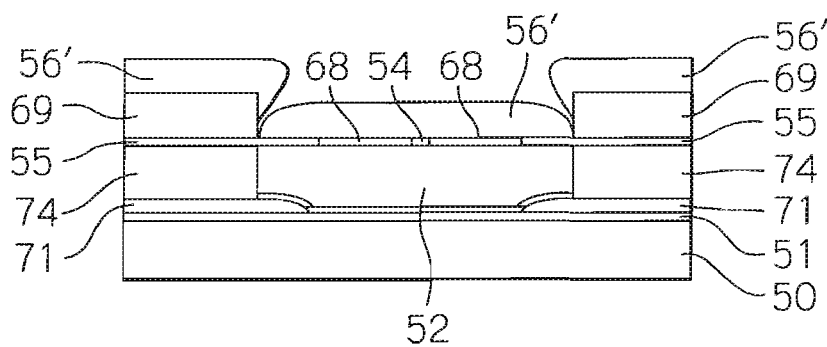

Then, a film 56' for an upper shield layer is deposited (Step S46). The film 56' for an upper shield layer is deposited by sputtering a metal magnetic material such as FeAlSi, NiFe, CoFe, FeNiCo, FeN, FeZrN, FeTaN, CoZrNb or CoZrTa to have a thickness in the range from approximately 0.1 to 3 µm. This state is shown in FIG. 11k.

Figure 11L:
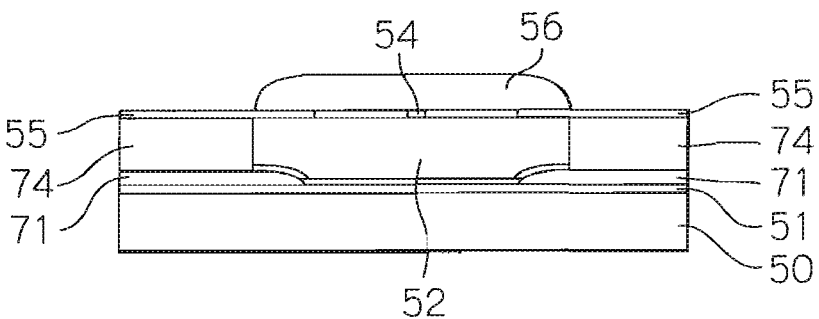

Then, lift-off is performed by removing the mask 69 to obtain the upper shield layer 56 as shown in FIG. 11l (Step S47).

Thereafter, a film for an insulation layer of an insulation material such as $Al_2O_3$ or $SiO_2$ is deposited on the upper shield layer 56 by sputtering for example and the surface of the film is planarized by CMP for example (Step S48).

The films of the magnetization fixed layer, the barrier layer and the magnetization free layer that constitute the magneto-sensitive portion of the TMR multi-layered structure 54 are not limited to the configurations described above, but various materials and thicknesses may be used. For example, the magnetization fixed layer is not limited to the four-layered structure of three films and an anti-ferromagnetic film, but may have a two-layered structure of a ferromagnetic film and an anti-ferromagnetic film, or a multi-layered structure of more or less than four films. The magnetization free layer is not limited to the two-layered structure, but may have a single-layer structure without the high-polarizability film, or a multi-layered structure of more than three films including a magnetostriction control film. Furthermore, the magnetization fixed layer, barrier layer and magnetization free layer of the magneto-sensitive portion may be laminated in the inverse order, that is, in the order of the magnetization free layer, the barrier layer and the magnetization fixed layer from the bottom. In that case, the anti-ferromagnetic film in the magnetization fixed layer is positioned at the top.

In the exemplary process for manufacturing the TMR read head element described above, the lower shield layer 52 is formed relatively thick by plating whereas the upper shield layer 56 is formed significantly thin by a dry fabrication process as sputtering. However, according to this embodiment, the lower corners 52a of the lower shield layer 52 along the track-width direction have an obtuse shape having a recess and the upper corners 56a of the upper shield layer 56 along the track-width direction also have a rounded shape. Because the portion of the lower shield layer 52 exposed at the ABS is thick and obtuse and the portion of the upper shield layer 56 exposed at the ABS is rounded, magnetic fields do not concentrate at the end edges that appear at the ABS of the lower shield layer 52 and the upper shield layer 56. Therefore, magnetic flux leakage at the end edges can be prevented and accordingly an unwanted write to a magnetic medium is prevented.

Figure 12:
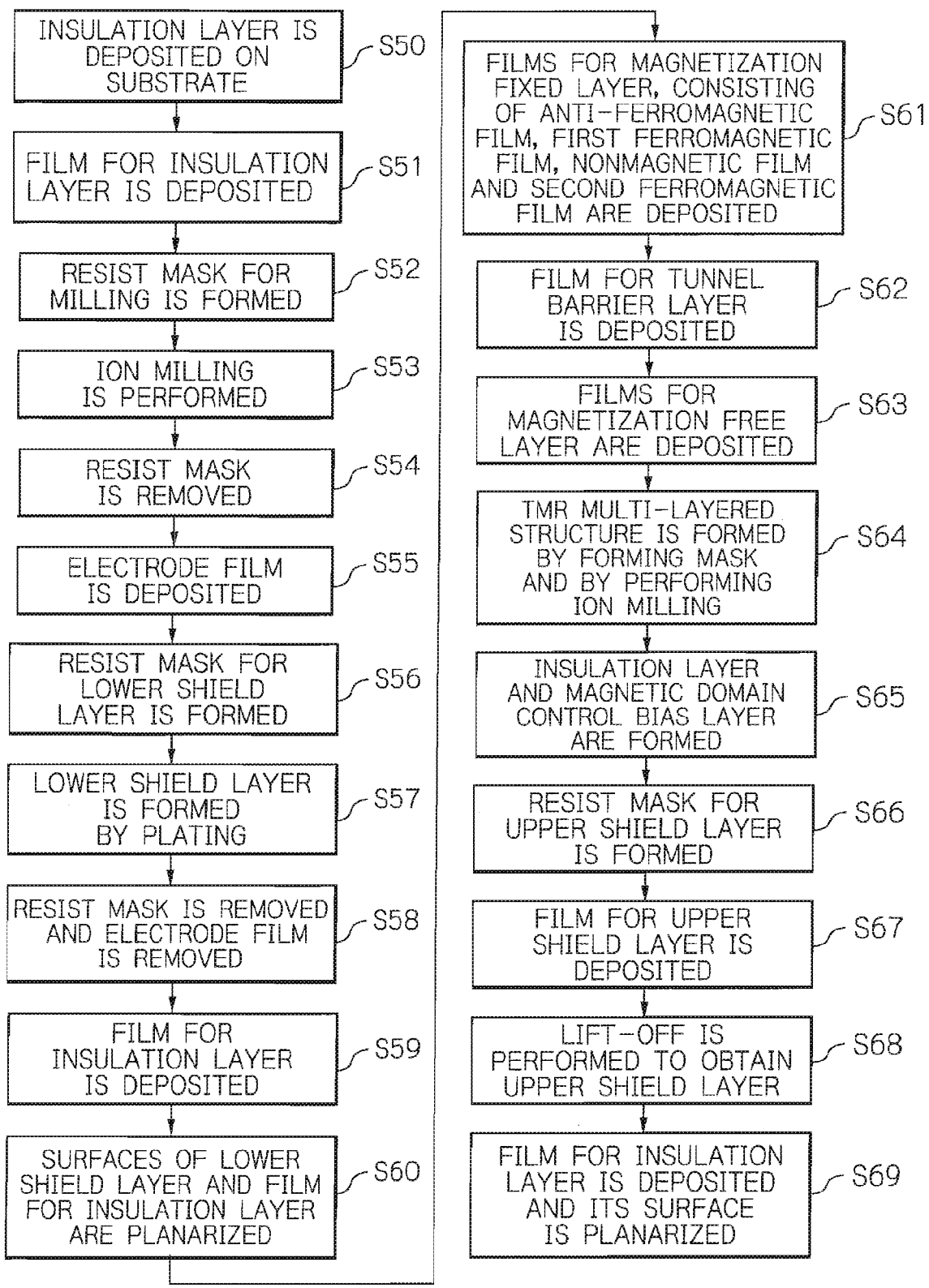
FIG. 12 is a flowchart illustrating in detail yet another exemplary process for manufacturing a read head element in the thin-film magnetic head manufacturing process shown in FIG. 7.

FIG. 12 illustrates in detail further exemplary of process flow for manufacturing a TMR read head element in the thin-film magnetic head manufacturing process shown in FIG. 7, and FIGS. 13a to 13m schematically illustrate cross sections of the TMR read head element fabricated by the manufacturing process sequence shown in FIG. 12. In the following description, components equivalent to those in the example shown in FIG. 8 and FIGS. 9a to 9k are labeled the same reference numerals even if their structures are somewhat different.

Figure 13A:
FIGS. 13a to 13m are cross-sectional views schematically illustrating the manufacturing process sequence shown in FIG. 12.

First, an underlying insulation layer 51 is deposited on a substrate 50 as shown in FIG. 13a (Step S50).

Figure 13B:
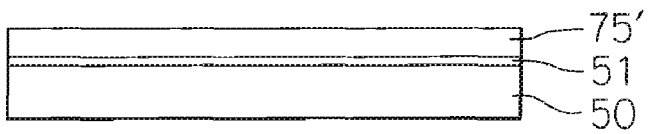

Then, a film 75' for an insulation layer of an insulation material such as $Al_2O_3$ or $SiO_2$ is deposited on the underlying insulation layer 51 by sputtering for example as shown in FIG. 13b (Step S51).

Figure 13C:
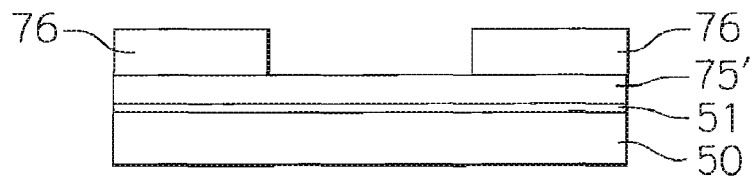

Then, a resist mask 76 having a milling pattern for forming the profile of the ABS section of a lower shield layer is formed on the underlying insulation layer 75' as shown in FIG. 13c (Step S52).

Figure 13D:
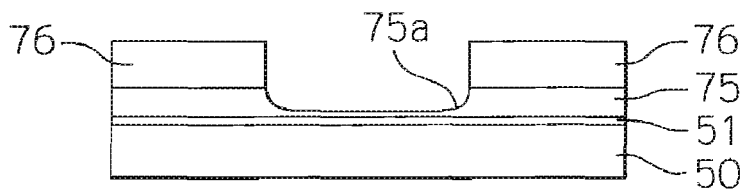

Then, ion milling is performed through the resist mask 76 as shown in FIG. 13d (Step S53) and then the resist mask 76 is removed (Step S54) to obtain the insulation layer 75 having a recess 75a on its upper surface.

Figure 13E:
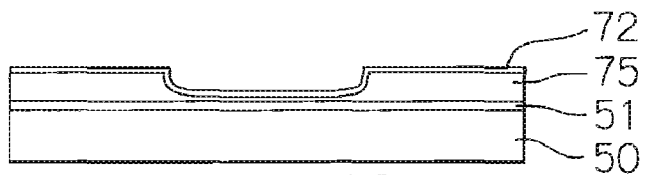

An electrode film 72 of a material such as Cu for plating is then deposited by sputtering for example as shown in FIG. 13e (Step S55).

Figure 13F:
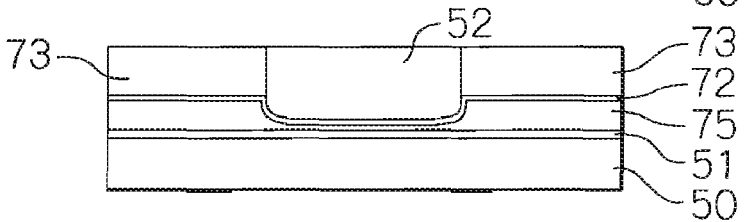

Then, a resist mask 73 for a lower shield layer is formed on the electrode film 72 as shown in FIG. 13f (Step S56) and the lower shield layer 52 is plated using the resist mask 73 as a frame (Step S57). The lower shield layer 52 is formed by the frame plating with a metal magnetic material such as FeAlSi, NiFe, CoFe, FeNiCo, FeN, FeZrN, FeTaN, CoZrNb or CoZrTa to have a thickness of approximately 0.1 to 3 μm.

Figure 13G:
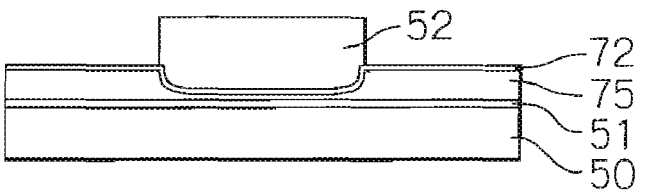
Figure 13H:
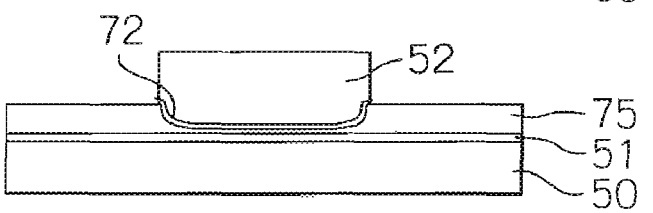

Then, the resist mask 73 is removed as shown in FIG. 13g and the exposed portion of the electrode film 72 is removed by milling for example as shown in FIG. 13h (Step S58).

Figure 13I:
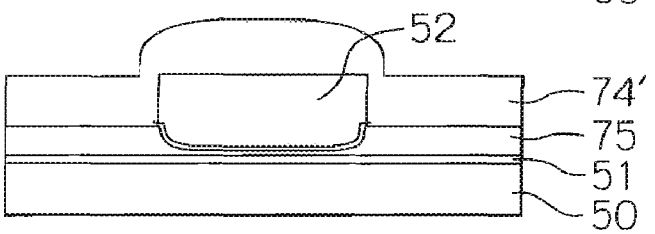

Then, a film 74' for an insulation layer of an insulation material such as $Al_2O_3$ or $SiO_2$ is deposited by sputtering for example as shown in FIG. 13i (Step S59).

Figure 13J:
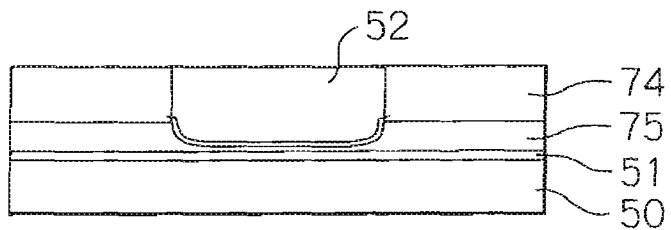

The surfaces of the lower shield layer 52 and the film for an insulation layer 74' are then planarized by CMP for example as shown in FIG. 13j (Step S60).

Then, a TMR multi-layered structure 54, a magnetic domain control layer 68, and an insulation layer 54 are formed on the lower shield layer 52 and insulation layer 74 as follows.

First, films for a magnetization fixed layer are deposited on the lower shield layer 52 and the insulation layer 74 (Step S61). The films for magnetization fixed layer in this embodiment are of synthetic type, deposited by sputtering an anti-ferromagnetic film (film for a pin layer) of a material such as IrMn, PtMn, NiMn or RuRhMn with a thickness of approximately 5 to 30 nm, a first ferromagnetic film of a material such as CoFe with a thickness of approximately 1 to 5 nm, a nonmagnetic film of one of or an alloy of two or more of materials such as Ru, Rh, Ir, Cr, Re and Cu with a thickness of approximately 0.8 nm, and a second ferromagnetic film of a material such as CoFe, CoFeSi, CoMnGe, CoMnSi or CoMnAl with a thickness of approximately 1 to 3 nm, in this order.

The anti-ferromagnetic material film for the pin layer is deposited by applying a magnetic filed into the layer plane in a direction perpendicular to the ABS, that is in a direction perpendicular to the magnetization direction of the free layer of the TMR multi-layered structure, at a temperature higher than the blocking temperature of the anti-ferromagnetic material. In modifications, the magnetization direction of the pin layer may be fixed by performing annealing under magnetic field in a process separated from the deposition.

Then, a film for a tunnel barrier layer of an oxide of Al, Ti, Ta, Zr, Hf, Mg, Si or Zn with a thickness of approximately 0.5 to 1 nm is deposited on the film for a magnetization fixed layer (Step S62).

Then, films for a free layer are formed on the film for a tunnel barrier layer by depositing a high-polarizability film of a material such as CoFe, CoFeSi, CoMnGe, CoMnSi or CoMnAl with a thickness of approximately 1 nm and a soft magnetic film of a material such as NiFe with a thickness of approximately 1 to 9 nm in this order by sputtering for example (Step S63). During the deposition of the films for a free layer, a magnetic field is applied to control the magnetization direction.

Figure 13K:
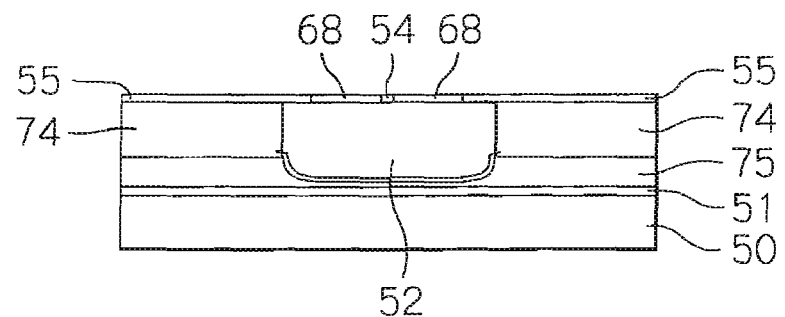

Then, the TMR multi-films thus formed is patterned (Step S64). First, a mask (not shown) having a resist pattern for lift-off is formed on the TMR multi-films and ion milling is performed through the mask. As a result of the ion milling, a TMR multi-layered structure 54 consisting of multiple layers including a magnetization fixed layer, a tunnel barrier layer and a magnetization free layer, in this order from the bottom, can be obtained. This state is shown in FIG. 13k.

Then, a film for an insulation layer of an insulation material such as $Al_2O_3$ or $SiO_2$ is deposited on the TMR multi-layered structure 54 to have a thickness in the range from approximately 3 to 20 nm by sputtering or IBD for example, and a film for a magnetic domain control bias layer is deposited by sputtering or IBD for example to have a thickness in the range from approximately 10 to 40 nm. Thereafter, lift-off is performed by removing the mask. As a result, a magnetic domain control bias layer 68 and an insulting layer 55 are formed on the side surfaces of the TMR multi-layered structure 54 (Step S65).

Then, a resist mask 69 having a pattern for forming an upper shield layer is formed thereon (Step S66).

Figure 13L:
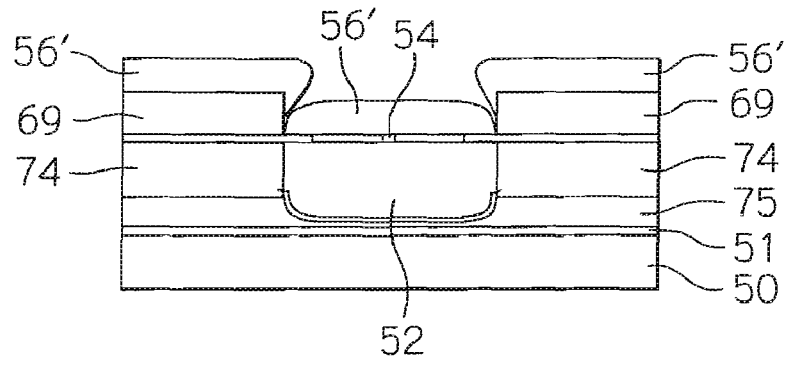

Then, a film 56' for an upper shield layer is deposited (Step S67). The film 56' for an upper shield layer is deposited by sputtering a metal magnetic material such as FeAlSi, NiFe, CoFe, FeNiCo, FeN, FeZrN, FeTaN, CoZrNb or CoZrTa to have a thickness in the range from approximately 0.1 to 3 μm. This state is shown in FIG. 13l.

Figure 13M:
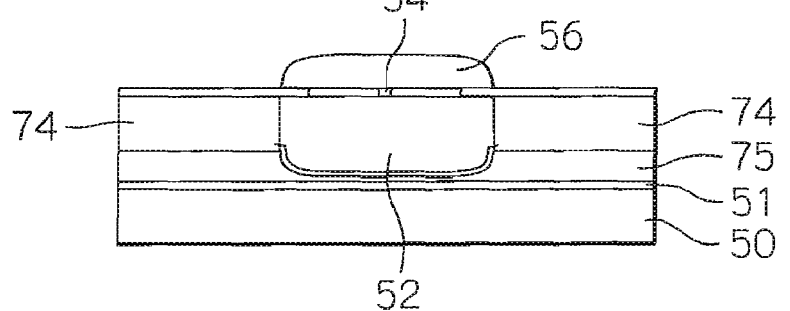

Then, lift-off is performed by removing the mask 69 to obtain the upper shield layer 56 as shown in FIG. 13m (Step S68).

Thereafter, a film for an insulation layer of an insulation material such as $Al_2O_3$ or $SiO_2$ is deposited on the upper shield layer 56 by sputtering for example and the surface of the film is planarized by CMP for example (Step S69).

The films of the magnetization fixed layer, the barrier layer and the magnetization free layer that constitute the magneto-sensitive portion of the TMR multi-layered structure 54 are not limited to the configurations described above, but various materials and thicknesses may be used. For example, the magnetization fixed layer is not limited to the four-layered structure of three films and an anti-ferromagnetic film, but may have a two-layered structure of a ferromagnetic film and an anti-ferromagnetic film, or a multi-layered structure of more or less than four films. The magnetization free layer is not limited to the two-layered structure, but may have a single-layer structure without the high-polarizability film, or a multi-layered structure of more than three films including a magnetostriction control film. Furthermore, the magnetization fixed layer, barrier layer and magnetization free layer of the magneto-sensitive portion may be laminated in the inverse order, that is, in the order of the magnetization free layer, the barrier layer and the magnetization fixed layer from the bottom. In that case, the anti-ferromagnetic film in the magnetization fixed layer is positioned at the top.

In the exemplary process for manufacturing the TMR read head element described above, the lower shield layer 52 is formed relatively thick by plating whereas the upper shield layer 56 is formed significantly thin by a dry fabrication process as sputtering. However, according to this embodiment, the lower corners 52a of the lower shield layer 52 along the track-width direction have an obtuse shape having a recess and the upper corners 56a of the upper shield layer 56 along the track-width direction also have a rounded shape. Because the portion of the lower shield layer 52 exposed at the ABS is thick and obtuse and the portion of the upper shield layer 56 exposed at the ABS is rounded, magnetic fields do not concentrate at the end edges that appear at the ABS of the lower shield layer 52 and the upper shield layer 56. Therefore, magnetic flux leakage at the end edges can be prevented and accordingly an unwanted write to a magnetic medium is prevented.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head provided with at least one magnetoresistive effect read head element comprising:
   a substrate;
   a lower-side shield layer provided above the substrate, the lower-side shield layer having lower-side end edges and upper-side end edges, the lower-side end edges being closer to the substrate than the upper-side end edges;
   an upper-side shield layer provided above the lower-side shield layer, the lower-side shield layer being closer to the substrate than the upper-side shield layer; and
   a magnetoresistive effect layer formed between said lower-side shield layer and said upper-side shield layer,
   a profile of said lower-side shield layer, appeared at an air bearing surface, having obtuse or rounded corners at the lower-side end edges of said lower-side shield layer along a track-width direction.

2. The thin-film magnetic head as claimed in claim 1, wherein said magnetic head further comprises an inductive write head element formed on the magnetoresistive effect read head element.

3. The thin-film magnetic head as claimed in claim 2, wherein said inductive write head element is a perpendicular-magnetic-recording write head element.

4. A thin-film magnetic head provided with at least one magnetoresistive effect read head element comprising:
   a substrate;
   a lower-side shield layer provided above the substrate, the lower-side shield layer having lower-side end edges and upper-side end edges, the lower-side end edges being closer to the substrate than the upper-side end edges;
   an upper-side shield layer provided above the lower-side shield layer, the upper-side shield layer having lower-side end edges and upper-side end edges, the upper-side end edges of the upper-side shield layer being farther from the substrate than the lower-side end edges of the upper-side shield layer, the lower-side shield layer being closer to the substrate than the upper-side shield layer; and
   a magnetoresistive effect layer formed between said lower-side shield layer and said upper-side shield layer,
   a profile of a combination of said lower-side shield layer and said upper-side shield layer, appeared at an air bearing surface, having obtuse or rounded corners at the lower-side end edges of said lower-side shield layer along a track-width direction and obtuse or rounded corners at the upper-side end edges of said upper-side shield layer along the track-width direction.

5. The thin-film magnetic head as claimed in claim 4, wherein said magnetic head further comprises an inductive write head element formed on the magnetoresistive effect read head element.

6. The thin-film magnetic head as claimed in claim 5, wherein said inductive write head element is a perpendicular-magnetic-recording write head element.

7. A magnetic head assembly including a thin-film magnetic head and a support member for supporting said thin-film magnetic head, said thin-film magnetic-head provided with at least one magnetoresistive effect read head element comprising:
   a substrate;
   a lower-side shield layer provided above the substrate, the lower-side shield layer having lower-side end edges and upper-side end edges, the lower-side end edges being closer to the substrate than the upper-side end edges;
   an upper-side shield layer provided above the lower-side shield layer, the lower-side shield layer being closer to the substrate than the upper-side shield layer; and
   a magnetoresistive effect layer formed between said lower-side shield layer and said upper-side shield layer,
   a profile of said lower-side shield layer, appeared at an air bearing surface, having obtuse or rounded corners at the lower-side end edges of said lower-side shield layer along a track-width direction.

8. A magnetic head assembly including a thin-film magnetic head and a support member for supporting said thin-film magnetic head, said thin-film magnetic-head provided with at least one magnetoresistive effect read head element comprising:
   a substrate;
   a lower-side shield layer provided above the substrate, the lower-side shield layer having lower-side outer end edges and upper-side end edges, the lower-side outer end edges being closer to the substrate than the upper-side end edges;
   an upper-side shield layer provided above the lower-side shield layer, the upper-side shield layer having lower-side end edges and upper-side end edges, the upper-side end edges of the upper-side shield layer being farther from the substrate than the lower-side end edges of the upper-side shield layer, the lower-side shield layer being closer to the substrate than the upper-side shield layer; and
   a magnetoresistive effect layer formed between said lower-side shield layer and said upper-side shield layer,
   a profile of a combination of said lower-side shield layer and said upper-side shield layer, appeared at an air bearing surface, having obtuse or rounded corners at the lower-side outer end edges of said lower-side shield layer along a track-width direction and obtuse or rounded corners at the upper-side end edges of said upper-side shield layer along the track-width direction.

9. A magnetic disk drive apparatus including at least one magnetic disk, and a magnetic head assembly having a thin-film magnetic head and a support member for supporting said thin-film magnetic head, said thin-film magnetic head provided with at least one magnetoresistive effect read head element comprising:
   a substrate;
   a lower-side shield layer provided above the substrate, the lower-side shield layer having lower-side end edges and upper-side end edges, the lower-side end edges being closer to the substrate than the upper-side end edges;

an upper-side shield layer provided above the lower-side shield layer, the lower-side shield layer being closer to the substrate than the upper-side shield layer; and a magnetoresistive effect layer formed between said lower-side shield layer and said upper-side shield layer, a profile of said lower-side shield layer, appeared at an air bearing surface, having obtuse or rounded corners at the lower-side end edges of said lower-side shield layer along a track-width direction.

10. A magnetic disk drive apparatus including at least one magnetic disk, and a magnetic head assembly having a thin-film magnetic head and a support member for supporting said thin-film magnetic head, said thin-film magnetic head provided with at least one magnetoresistive effect read head element comprising:

a substrate, a lower-side shield layer provided above the substrate, the lower-side shield layer having lower-side end edges and upper-side end edges, the lower-side end edges being closer to the substrate than the upper-side end edges;

an upper-side shield layer provided above the lower-side shield layer, the upper-side shield layer having lower-side end edges and upper-side end edges, the upper-side end edges of the upper-side shield layer being farther from the substrate than the lower-side end edges of the upper-side shield layer, the lower-side shield layer being closer to the substrate than the upper-side shield layer; and a magnetoresistive effect layer formed between said lower-side shield layer and said upper-side shield layer, a profile of a combination of said lower-side shield layer and said upper-side shield layer, appeared at an air bearing surface, having obtuse or rounded corners at the lower-side end edges of said lower-side shield layer along a track-width direction and obtuse or rounded corners at the upper-side end edges of said upper-side shield layer along the track-width direction.

11. A method for manufacturing a thin-film magnetic head provided with at least one magnetoresistive effect read head element, the at least one magnetoresistive effect read head element having:

a substrate;

a lower-side shield layer provided above the substrate, the lower-side shield layer having lower-side end edges and upper-side end edges, the lower-side end edges being closer to the substrate than the upper-side end edges;

an upper-side shield layer provided above the lower-side shield layer, the upper-side shield layer having lower-side end edges and upper-side end edges, the upper-side end edges of the upper-side shield layer being farther from the substrate than the lower-side end edges of the upper-side shield layer, the lower-side shield layer being closer to the substrate than the upper-side shield layer; and a magnetoresistive effect layer formed between said lower-side shield layer and said upper-side shield layer, a profile of said lower-side shield layer, appeared at an air bearing surface, having obtuse or rounded corners at the lower-side end edges of said lower-side shield layer along a track-width direction; said method for manufacturing the thin film magnetic head comprising the steps of:

forming a resist mask for the upper-side shield layer;

depositing a film for the upper-side shield layer on the formed resist mask; and lifting off said resist mask to form said upper-side shield layer having a profile, appeared at an air bearing surface, of obtuse or rounded corners at the upper-side end edges of the upper-side shield layer along the track-width direction.

12. The manufacturing method as claimed in claim 11, said method further comprises a step of depositing an insulation layer, a step of forming a resist mask for the lower-side shield layer on said insulation layer, a step of removing a part of said insulation layer by wet etching through the formed resist mask, a step of removing said resist mask and then forming a film for the lower-side shield layer, and a step of planarizing an upper surface of the formed film for the lower-side shield layer to form the lower-side shield layer having the profile of the lower-side shield layer, appeared at an air bearing surface, of obtuse or rounded corners at the lower-side end edges of said lower-side shield layer along the track-width direction.

13. The manufacturing method as claimed in claim 12, wherein said method further comprises a step of forming a resist mask for plating on the insulation layer, and a step of plating the lower-side shield layer using the formed resist mask.

14. The manufacturing method as claimed in claim 13, wherein said method further comprises a step of forming an electrode film for plating before forming said resist mask for plating.

15. The manufacturing method as claimed in claim 12, wherein said method further comprises a step of forming a first resist mask for the lower-side shield layer on the insulation layer, a step of removing a part of the insulation layer by milling through the formed first resist mask, a step of removing the first resist mask and then forming a second resist mask for the lower-side shield layer, and a step of plating the lower-side shield layer using the formed second resist mask to have the profile of the lower-side shield layer, appeared at an air bearing surface, of obtuse or rounded corners at the lower-side end edges of said lower-side shield layer along the track-width direction.

16. The manufacturing method as claimed in claim 15, wherein said method further comprises a step of forming an electrode film for plating before forming said second resist mask for plating.

* * * * *